May 13, 1952     W. ST. MAUR ELMORE CRAKE     2,596,534
WIDE RANGE FLOW CONTROL VALVE

Filed June 14, 1948                              2 SHEETS—SHEET 1

INVENTOR
WILFRED ST. MAUR ELMORE CRAKE
BY *Oswald H. Milmore*
HIS ATTORNEY

May 13, 1952  W. ST. MAUR ELMORE CRAKE  2,596,534
WIDE RANGE FLOW CONTROL VALVE

Filed June 14, 1948  2 SHEETS—SHEET 2

INVENTOR
WILFRED ST. MAUR ELMORE CRAKE
BY  *Oswald H. Milmore*
HIS ATTORNEY

Patented May 13, 1952

2,596,534

UNITED STATES PATENT OFFICE 2,596,534

WIDE RANGE FLOW CONTROL VALVE

Wilfred St. Maur Elmore Crake, Houston, Tex., assignor to Shell Development Company, San Francisco, Calif., a corporation of Delaware Application June 14, 1948, Serial No. 32,967

6 Claims. (Cl. 251—34)

This invention relates to wide-range flow control valves, i. e., to valves which control the flow of a fluid over a wide range of flow rates.

In certain operations, a valve of extreme range is required in order to control the flow of liquid under all conditions of the job in hand. For example, on automatic oil well drilling controls (see U. S. Patent No. 2,371,953), it is desired, due to the extreme range of hardness of earth formations, to advance the drill string into a well at a controlled rate. This is effected by unwinding a supporting cable from a drum, the drum being connected to drive a pump having its discharge line throttled by a central valve. The rate of turning of the drum is proportional to the rate of flow of the pumped liquid, and can be regulated by means of the valve. The desired rates at which the drill string is lowered may vary from three inches per hour to 125 or more feet per hour. This corresponds to a range of 500:1 or more over which one valve is required to control flow with accuracy. Ordinary valves will not give accurate control over a range in excess of 20:1, and it therefore becomes necessary to provide hand operated or complex automatic by-pass or "step" valves to give multiple ranges.

It is an object of this invention to provide a valve suitable for controlling the fluid, e. g., liquid or gas or a suspension over a wider range than was possible with the valves used heretofore. A further object is to provide an improved wide range flow valve which will control the flow of fluid accurately over a wider range than ordinary valve, e. g., over a range of the order of 500:1 and higher.

According to this invention the valve is provided with a body providing a tubular control cylinder having a helically arranged series of openings of progressively increasing sizes. The control cylinder is arranged for movement relative to a coacting cylindrical closure so that the holes may be progressively uncovered to establish flow communication between the inside and the outside of the control cylinder. In the preferred embodiment, illustrated on the drawings, the control cylinder is movable and the cylindrical closure is a surrounding sleeve fixed within the valve body. It is, however, also within the scope of the invention to achieve this relative motion in other ways, e. g., by constructing the cylindrical closure as a piston inside of the control cylinder for covering and progressively uncovering the holes from the inside of the control cylinder. Moreover, relative motion between the control cylinder and the closure may be effected by mounting either element for movement, while maintaining the other element fixed with respect to the valve body, or by making both elements movable, such variants being well within the scope of a person skilled in the art.

The invention will be better understood by referring to the accompanying drawings forming a part of this specification and showing two preferred embodiments of the invention by way of illustration. In the drawings.

Figure 1:
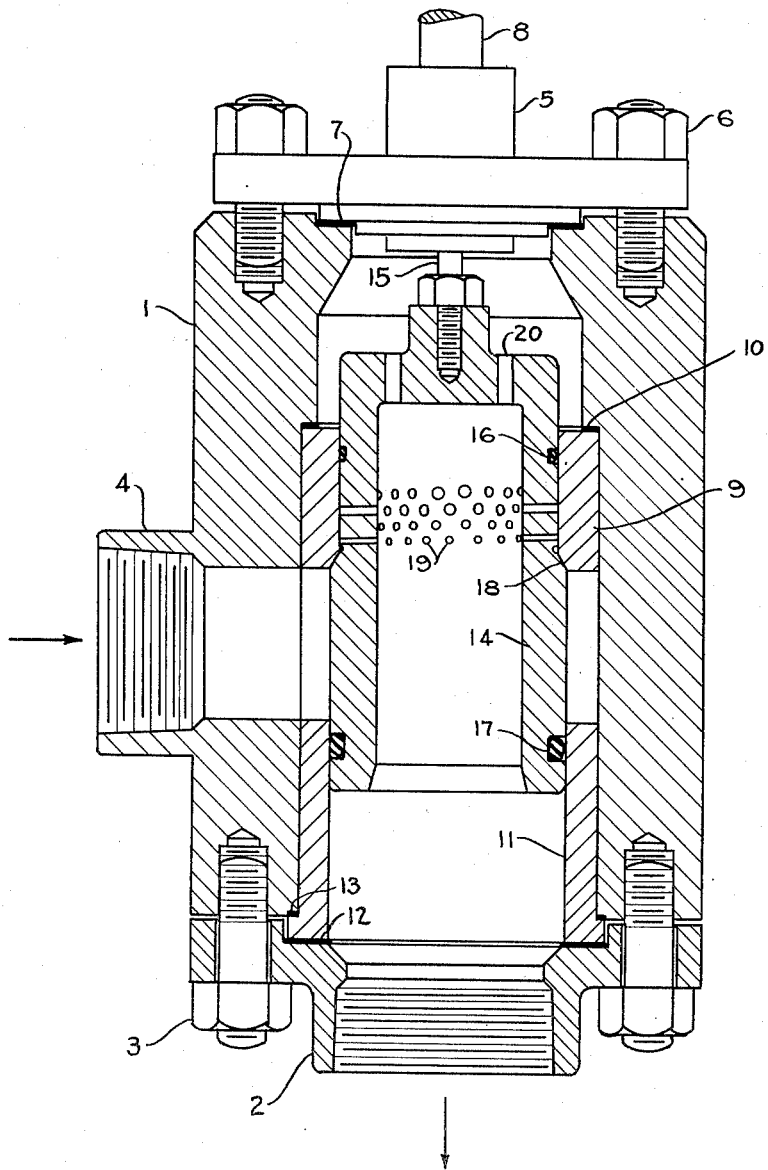
Fig. 1 is a longitudinal sectional view of a valve constructed according to the present invention.
Figure 2:
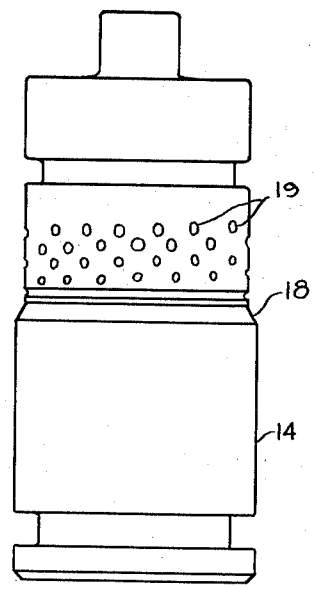
Fig. 2 is an elevational view of the control cylinder.

Referring to Figs 1 and 2, the valve comprises a body 1 provided with an internally threaded head 2 forming an outlet passageway to which an outlet line may be attached and secured by studs 3. An internally threaded sleeve 4 is welded to the side and forms the inlet passageway. A conventional valve bonnet 5 is bolted to the top of the valve by studs 6 and sealed by a gasket 7 and is provided with a spindle 8 with a polygonal end to which a handle or wrench may be applied for effecting rotation. Such rotation causes vertical movement of depending stud 15. The threads within the bonnet being of conventional construction, it is not believed necessary to show them in detail.

An upper sleeve 9 is fitted within the bore of the valve body by a class 7 fit, i. e., with a tight fit which may be regarded as permanent. The sleeve may be inserted with considerable pressure aided, if desired, by heating the valve body to expand it during assembly. A sealing gasket 10 is optionally provided at the top of the sleeve. A lower sleeve 11 is retained in the valve body by means of the head 2 and secured against upward movement by a flange, as shown, the flange being in engagement with gaskets 12 and 13. A control cylinder 14, having a close sliding fit with the sleeves 9 and 11, is connected at the top to the stud 15 depending from the bonnet and sealed against the sleeves by O-seal rings 16 and 17.

The control cylinder 14 and the upper sleeve 9 have coacting conical surfaces 18, the lower portion of the cylinder 14 being of greater external diameter than the upper portion. A plurality of holes 19 is provided in the control cylinder, these holes being arranged along a helical path and being of progressively larger sizes starting from the bottom. The upper sleeve 9 in this embodiment functions as the cylindrical closure and closes the holes when the control cylinder 14 is in its relative upward position as shown in Fig. 1. Ports 20 at the top of the control cylinder balance the vertical pressures on the cylinder.

In operation, flow is completely stopped when the conical surfaces 18 are in engagement. When the spindle 8 is rotated to move the stud 15 and control cylinder 14 downwards, the smallest and lowermost hole 19 is first partially uncovered. Flow through this hole and slippage between the sleeve 9 and the control cylinder provide a very low rate of flow. As the control cylinder is progressively lowered the smallest hole is completely uncovered and additional, larger holes are progressively uncovered, thereby permitting a progressively greater flow of fluid. The O-seal rings 16 and 17 prevent bypassing of fluid when the valve is closed or partially open.

By this arrangement it is possible to provide accurate control of the flow of fluid over extremely wide ranges, i. e., higher than 50:1, e. g., of the order of 500:1 and greater. I am aware that holes of different sizes have heretofore been provided in tubular control pistons, but these did not provide a helical arrangement of the holes. By my improved arrangement I am able to obtain an accurate throttling of the fluid at the low flow rates and materially extend the control range.

Figure 3:
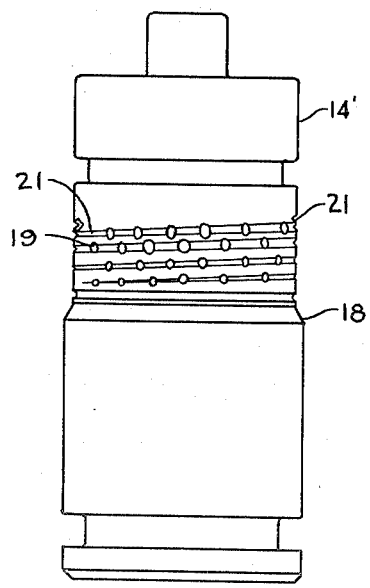
Fig. 3 is a half-sectional and half-elevational view of a modified form of control cylinder.

In the modified form according to Fig. 3, the control cylinder 14' is provided with a similar series of holes 19, which are connected by a helical groove 21 which increases in width and depth from the bottom. This cylinder may be mounted in a valve body such as that shown in Fig. 1. As the control cylinder is lowered the cross-sectional area of the groove exposed to the entering fluid increases. A portion of the fluid flows through the exposed holes and additional fluid flows through the groove and into the control cylinder through the holes which are still opposite the upper sleeve 9.

I claim as my invention:

1. A balanced wide range flow control valve having inlet and outlet passageways comprising a tubular control cylinder having a plurality of holes arranged in a helical path and of progressively increasing sizes starting from one end of said path, the interior of said cylinder being open at both ends and in flow communication with one of said passageways and the space outside of said cylinder being in flow communication with the other of said passageways, a cylindrical closure mounted for both rotating and axial movement relative to said control cylinder for covering all of said holes in one relative position and for progressively uncovering an increasing number of said holes during such relative movement and shaft means secured to said cylinder for rotating said tubular control cylinder to a fixed position to permit a constant predetermined flow through said valve.

2. The valve according to claim 1 wherein the surface of said control cylinder in engagement with said closure is provided with a helical groove connecting said holes.

3. The valve according to claim 2 wherein said helical groove has a tapered cross-sectional area increasing from the smallest hole toward the larger holes.

4. A balanced wide range flow control valve having inlet and outlet passageways comprising a valve body bored to provide first and second coaxial cylindrical bores spaced apart longitudinally, the space between said bores being in flow communication with one of said passageways and the second of said bores being in flow communication with the other of said passageways, a tubular control cylinder open at both ends rotatably and slidably mounted in said bores, said cylinder having a plurality of holes through the wall thereof, said holes being arranged in a helical path and being of progressively increasing sizes starting from the end of said path nearer said second bore, said holes being located so that an increasing number of holes are completely covered by the wall of the said first bore when said valve is closed and to be progressively uncovered by movement of said cylinder toward said second bore and shaft means secured to said cylinder for rotating said tubular control cylinder to a fixed position to permit a constant predetermined flow through said valve.

5. A control valve according to claim 4 wherein said second bore has a diameter greater than said first bore and the tubular control cylinder is provided with only two sections of different diameter separated by a single shoulder located beyond the smallest hole therein, said first bore being provided with a single seat adapted to be engaged by said shoulder to provide a positive shut off when said cylinder is moved toward said first bore.

6. In combination with the valve according to claim 4, sealing rings between said cylinder and each of said bores.

WILFRED ST. MAUR ELMORE CRAKE.

REFERENCES CITED

The following references are of record in the file of this patent:

UNITED STATES PATENTS

| Number | Name | Date |
|---|---|---|
| 1,405,833 | Gentzel | Feb. 7, 1922 |
| 1,589,224 | Rabe | June 15, 1926 |
| 1,679,257 | Neebe | July 31, 1928 |
| 1,754,138 | Agee | Apr. 8, 1930 |
| 1,859,876 | Koplin | May 24, 1932 |
| 1,998,239 | Irwin | Apr. 16, 1935 |
| 2,081,878 | Wittek | May 25, 1937 |
| 2,106,340 | Conover | Jan. 25, 1938 |
| 2,270,641 | Ruppert | Jan. 20, 1940 |
| 2,380,631 | Cones | July 31, 1945 |

FOREIGN PATENTS

| Number | Country | Date |
|---|---|---|
| 185,917 | Germany | of 1907 |
| 626,444 | Germany | of 1930 |